United States Patent
Seto

(10) Patent No.: US 8,630,021 B2
(45) Date of Patent: Jan. 14, 2014

(54) COLOR PROCESSING FOR GENERATION OF A PROFILE FOR COLOR SEPARATION

(75) Inventor: Takamasa Seto, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 561 days.

(21) Appl. No.: 12/944,222

(22) Filed: Nov. 11, 2010

(65) Prior Publication Data

US 2011/0134449 A1 Jun. 9, 2011

(30) Foreign Application Priority Data

Dec. 3, 2009 (JP) ................................ 2009-275936

(51) Int. Cl.
*H04N 1/60* (2006.01)
(52) U.S. Cl.
USPC ........................... 358/1.9; 358/504; 358/518
(58) Field of Classification Search
USPC ............ 358/1.1, 1.9, 500, 501, 504, 518, 521
See application file for complete search history.

(56) References Cited

U.S. PATENT DOCUMENTS

| 7,016,530 | B2 | 3/2006 | Saito et al. |
| 7,369,272 | B2 | 5/2008 | Ito et al. |
| 2005/0094871 | A1* | 5/2005 | Berns et al. ................... 382/162 |
| 2007/0201062 | A1* | 8/2007 | Watanabe ...................... 358/1.9 |
| 2007/0291312 | A1* | 12/2007 | Kaneko et al. ................. 358/2.1 |
| 2009/0310157 | A1* | 12/2009 | Wada ............................. 358/1.9 |
| 2011/0134487 | A1* | 6/2011 | Seto ............................. 358/3.23 |

FOREIGN PATENT DOCUMENTS

| JP | 2002-33930 | 1/2002 |
| JP | 2004-320625 | 11/2004 |

OTHER PUBLICATIONS

U.S. Appl. No. 12/938,167, filed Nov. 2, 2010. Applicant: Takamasa Seto.

\* cited by examiner

*Primary Examiner* — Thomas D Lee
(74) *Attorney, Agent, or Firm* — Fitzpatrick, Cella, Harper & Scinto

(57) ABSTRACT

A color value of output color reproduced based on an output signal value corresponding to an input color value of a grid point in an input color space, which is obtained by sampling a range of the output signal value, are estimated. An evaluation value that evaluates tonality between a color value estimated in correspondence with an input color value of a grid point of interest in the input color space and color values estimated in correspondence with input color values of grid points adjacent to the grid point of interest is calculated. When the input color value of the grid point of interest, whose evaluation value is less than a predetermined threshold value, is obtained, an output signal value corresponding to that input signal value is set in the grid point of interest.

9 Claims, 13 Drawing Sheets

| R | G | B | C | M | Y | K | Lc | Lm |
|---|---|---|---|---|---|---|----|----|
| 0 | 0 | 0 | 0 | 0 | 0 | 255 | 0 | 0 |
| 0 | 0 | 32 | 30 | 45 | 0 | 150 | 0 | 0 |
| 0 | 0 | 64 | 50 | 70 | 0 | 30 | 0 | 0 |
| 0 | 0 | 96 | 70 | 80 | 0 | 5 | 0 | 0 |
| 0 | 0 | 128 | 70 | 90 | 0 | 0 | 0 | 0 |
| 0 | 0 | 160 | 70 | 80 | 0 | 0 | 0 | 0 |
| 0 | 0 | 192 | 50 | 70 | 0 | 0 | 0 | 0 |
| 0 | 0 | 224 | 30 | 45 | 0 | 0 | 0 | 0 |
| 0 | 32 | 255 | 0 | 0 | 0 | 0 | 0 | 0 |
| 0 | 0 | 0 | 20 | 0 | 0 | 150 | 5 | 0 |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| 255 | 255 | 224 | 0 | 0 | 10 | 0 | 0 | 0 |
| 255 | 255 | 255 | 0 | 0 | 0 | 0 | 0 | 0 |

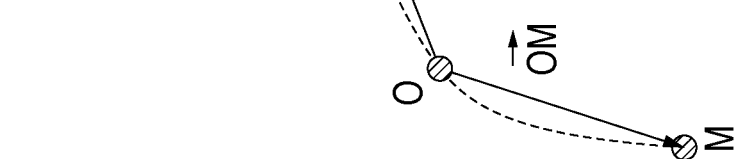
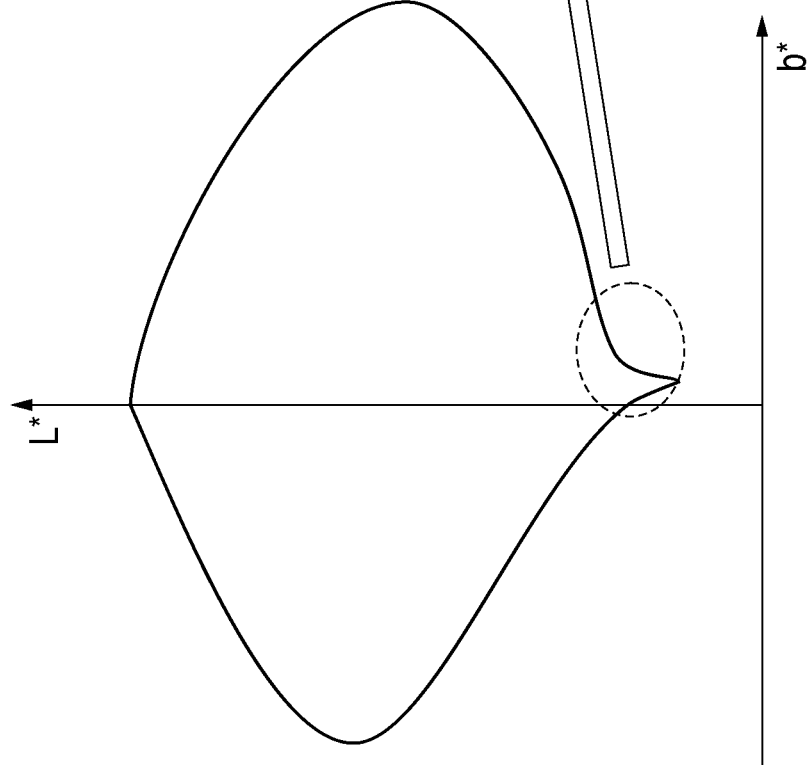

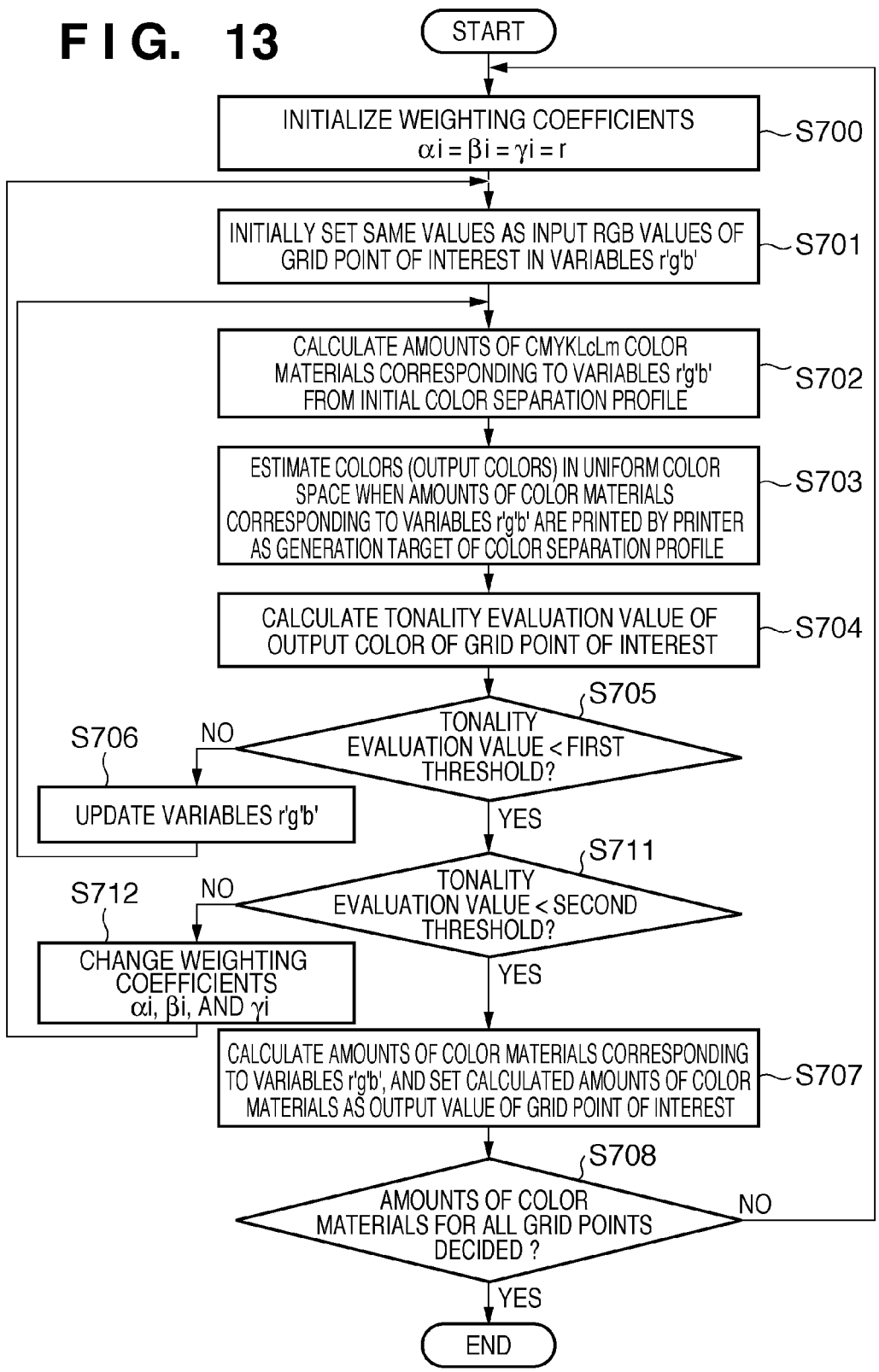

COLOR PROCESSING FOR GENERATION OF A PROFILE FOR COLOR SEPARATION

BACKGROUND OF THE INVENTION

1. Field of the Invention

The present invention relates to color processing for generating a profile for color separation, which indicates the relationship between input color values and output signal values to be output to an image forming device.

2. Description of the Related Art

Upon generation of a lookup table (LUT) for color separation, color-separated values of representative colors are manually calculated. Note that the color-separated values are equivalent to color signal values corresponding to amounts of color materials. Using a technique described in, for example, Japanese Patent Laid-Open No. 2002-033930 (patent reference 1), color-separated values of all grid points in a color space are interpolated using those of the representative colors, thus generating an LUT for color separation.

The technique of patent reference 1 performs the interpolation to obtain smooth changes of amounts of color materials, but does not consider obtaining smooth changes of reproduced colors. For this reason, linearity between an input color space such as an RGB space and an output color space such as a CMYK space cannot be maintained. When color separation processing is performed using linear interpolation such as tetrahedral interpolation, pseudo contours may be generated, and color reproduction precision may drop.

Japanese Patent Laid-Open No. 2004-320625 (patent reference 2) discloses a technique which estimates colors from amounts of color materials, and smoothes a color separation LUT so that reproduced colors of respective grid points become more uniform in a uniform color space with respect to an RGB space. However, with the technique of patent reference 2, when a gamut shape is deformed, the smoothing effect is reduced.

The smoothing effect reduction when the gamut shape is deformed will be described below with reference to FIGS. 1A and 1B. FIG. 1A illustrates the shape of a gamut of a certain printer, and shows an L*b* plane in a CIELab space. The gamut of the certain printer has a shape that is deformed to be drastically narrowed in a dark part with low lightness L*. FIG. 1B shows processing for smoothing output values (color-separated values) of grid points in the dark part shown in FIG. 1A. Reference symbols P, O, and M denote grid points, and a broken curve represents a color trace in the CIELab space, which is reproduced in practice. Output values of the grid points P and M are given, and an output value of the grid point O located between the grid points P and M is interpolated by the technique of patent reference 2. In this case, the grid point O is moved along the color trace indicated by the broken curve, and an output value corresponding to a point (color) on the trace where a vector sum of $\overrightarrow{OP}$ and $\overrightarrow{OM}$ is minimized is set in the grid point O.

As shown in FIG. 1B, a line segment which couples the grid points O and M deviates from the color trace that was actually reproduced. When an LUT for color separation is generated in such state, it is difficult to estimate an output value between the grid points O and M from those of surrounding grid points. Especially, when an output value corresponding to an arbitrary point (color) in an input color space is estimated from output values of surrounding grid points by tetrahedral interpolation, a pseudo contour is generated, and color reproduction precision drops in such region.

SUMMARY OF THE INVENTION

In one aspect, a method of generating a profile for color separation that indicates a relationship between input color values in an input color space and output signal values to be output to an image forming device, the method comprising: estimating a color value in a color space, which is represented by lightness and chromaticity, of an output color reproduced by an output signal value, wherein the output signal value is obtained by sampling a range of the output signal value and corresponds to an input color value of a grid point of the input color space; calculating an evaluation value of tonality between a color value estimated to an input color value of a grid point of interest of the input color space in the estimating step and color values estimated to input color values of grid points adjacent to the grid point of interest in the estimating step; determining whether or not the evaluation value becomes less than a predetermined threshold value by changing the input color value of the grid point of interest; setting the output signal value, which reproduces an output color corresponding to the estimated color value of the grid point of interest, to the grid point of interest when the input color value of the grid point of interest, that the evaluation value becomes less than the predetermined threshold value, is obtained, wherein in the calculating step, the evaluation value is calculated by enlarging weight in a direction of the lightness more than weight in a direction of the chromaticity.

According to the aspect, a profile for color separation can be generated in consideration of the shape of a gamut of an image forming device.

Further features of the present invention will become apparent from the following description of exemplary embodiments with reference to the attached drawings.

BRIEF DESCRIPTION OF THE DRAWINGS

FIGS. 4A and 4B are views for explaining a color separation profile.

FIGS. 12A and 12B are views for explaining a state in which output colors of grid points are optimized.

FIG. 13 is a flowchart for explaining processing for updating output values of grid points of a color separation profile according to the second embodiment.

DESCRIPTION OF THE EMBODIMENTS

Color processing according to an embodiment of the present invention will be described in detail hereinafter with reference to the drawings. An example of causing a computer to function as a color processing apparatus by running an application program for generating a profile for color separation (to be referred to as a color separation profile hereinafter) for an image forming device on the computer will be described below.

First Embodiment

[Apparatus Arrangement]

Figure 2:
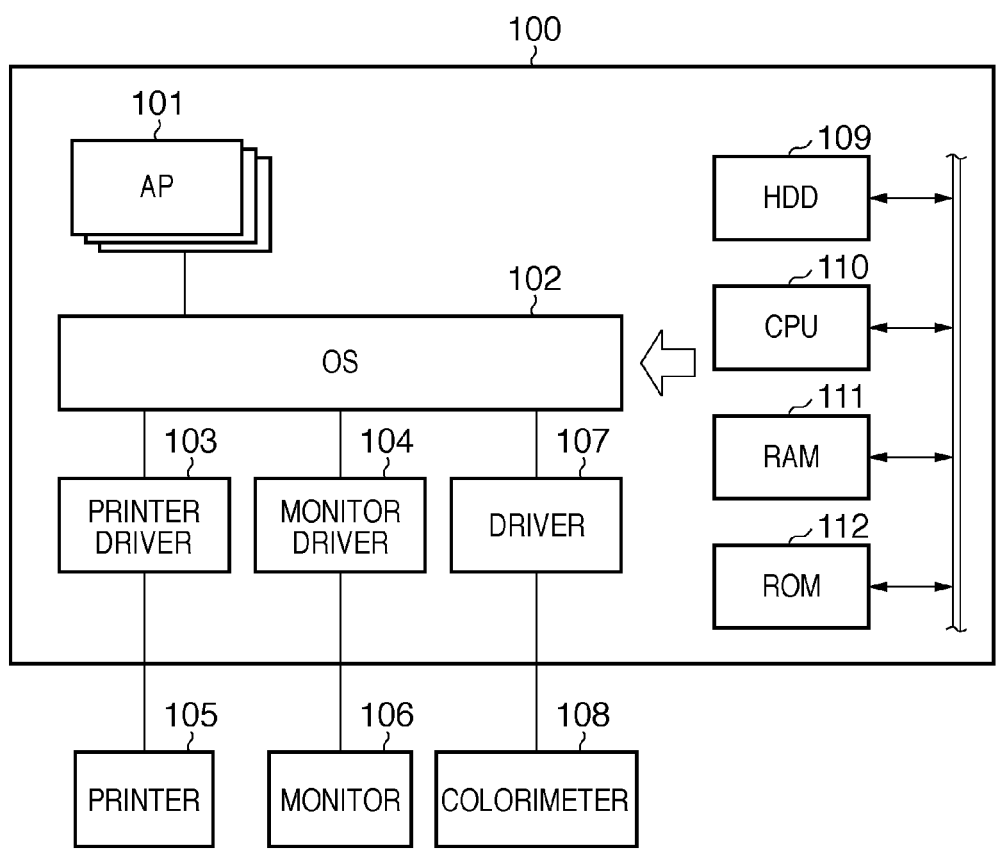
FIG. 2 is a block diagram for explaining the arrangement of a color processing apparatus according to an embodiment.

The arrangement of a color separation apparatus according to an embodiment will be described below using the block diagram shown in FIG. 2.

A microprocessor (CPU) 110 of a computer 100 executes programs stored in a read-only memory (ROM) 112 and hard disk drive (HDD) 109 using a random access memory (RAM) 111 as a work memory. These programs include an operating system (OS) 102, various application programs (AP) 101, and various driver programs. The left side of FIG. 2 shows the functional arrangement implemented by the OS 102 and AP 101.

The AP 101 displays a user interface (UI) on a monitor 106 via the OS 102 and a monitor driver 104. For example, when the user who operates the UI inputs a print instruction, the AP 101 issues a print request to the OS 102. Upon reception of the print request, the OS 102 receives data to be printed from the AP 101, and issues a print command and rendering command group to a printer driver 103 corresponding to a printer 105. Upon reception of the print command, the printer driver 103 receives the rendering command group from the OS 102, generates print data that the printer 105 can process, and outputs the print data to the printer 105.

More specifically, the printer driver 103 sequentially applies image correction processing to the rendering commands input from the OS 102, and rasterizes an image on, for example, a page memory of RGB 24 bits. Then, after all the rendering commands are rasterized, image data on the page memory is color-separated into a data format that the printer 105 can process, for example, CMKYLcLm data corresponding to respective color materials, thus outputting, for example, the CMKYLcLm data to the printer 105.

For example, when the user who operates the UI inputs a colorimetry instruction, the AP 101 issues a colorimetry request to the OS 102. Upon reception of the colorimetry request, the OS 102 issues a colorimetry command to a driver 107 corresponding to a colorimeter 108. Upon reception of the colorimetry command, the driver 107 controls the colorimeter 108 to measure colors of patches printed on, for example, a color chart, and to acquire their colorimetric values (for example, Lab values). The colorimetric values are stored in, for example, the RAM 111 by the OS 102 to be able to be referred to by the AP 101.

Although not shown, the computer 100 and the printer 105 and colorimeter 108 are connected via a serial bus interface such as a Universal Serial Bus (USB) interface. Also, the computer 100 and monitor 106 are connected via a video interface such as a video graphics array (VGA) or digital visual interface (DVI) interface.

[Printer Driver and Color Separation Profile Generation AP]

Figure 3:
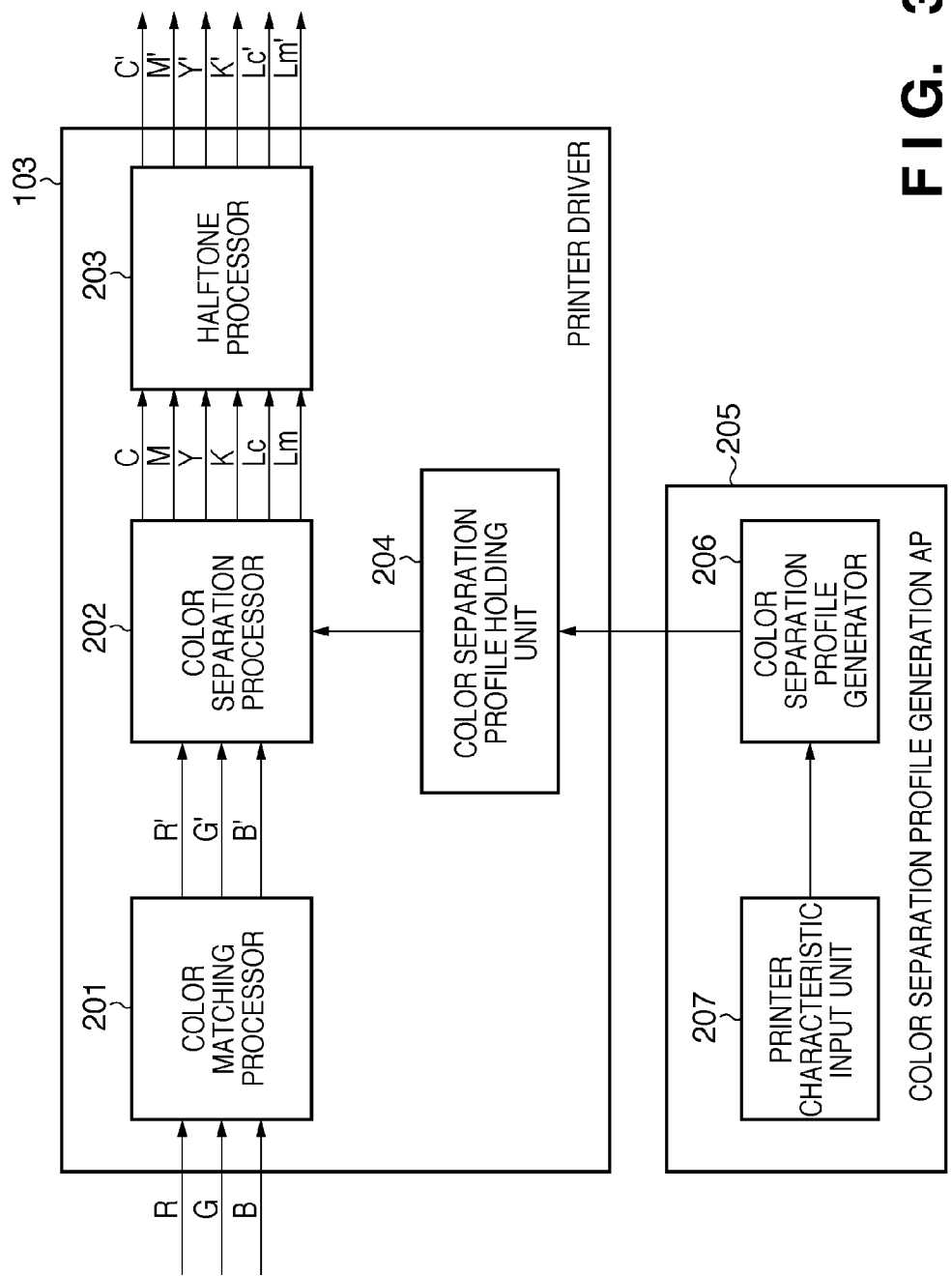
FIG. 3 is a block diagram for explaining the partial functional arrangement of a printer driver, and the functional arrangement of a color separation profile generation AP.

The partial functional arrangement of the printer driver 103 and the functional arrangement of a color separation profile generation AP 205 will be described below with reference to the block diagram shown in FIG. 3. Note that the color separation profile generation AP 205 is included in the AP 101 shown in FIG. 2.

A color matching processor 201 adjusts RGB values of input image signals so that colors that are obtained by reproducing an image expressed by rasterized image signals using the monitor 106 match those which are obtained by printing that image by the printer 105. The relationship between the RGB values and reproduced colors of the monitor 106 and that between the RGB values and printed colors of the printer 105 are described in International Color Consortium (ICC) profiles. That is, the color matching processor 201 is a color management module (CMM) which attains color conversion with reference to the ICC profiles.

A color separation processor 202 executes color separation processing for converting RGB image signals output from the color matching processor 201 into signal values corresponding to color material colors of the printer 105, for example, cyan C, magenta M, yellow Y, black K, light cyan Lc, and light magenta Lm. The color separation processor 202 executes the color separation processing with reference to a color separation profile according to print sheets used in print processing and a print mode, which profile is loaded from a color separation profile holding unit 204.

The color separation profile will be described below with reference to FIGS. 4A and 4B. FIG. 4A shows grid points distributed in a square grid pattern in an RGB space. An LUT, which stores signal values (output values) indicating amounts of CMYKLcLm color materials with respect to RGB values (input values) of these grid points, as shown in FIG. 4B, is the color separation profile. For example, the color separation profile stores output values indicating amounts of color materials respectively corresponding to 729 ($=9^3$) grid points obtained by slicing a range from 0 to 255 into 9 at intervals of 32 under the assumption that input RGB values are respectively 8-bit data ranging from 0 to 255. Note that the number of bits of input image data and the grid point intervals are arbitrary.

When R'G'B' data output from the color matching processor 201 do not correspond to any grid point of the color separation profile, the color separation processor 202 interpolates output values corresponding to the R'G'B' data using output values of surrounding grid points of the R'G'B' data. In general, this interpolation popularly uses tetrahedral interpolation, but give algorithms such as cubic interpolation may be applied.

A halftone processor 203 converts the CMYKLcLm data output from the color separation processor 202 into C'M'Y'K'Lc'Lm' data having a resolution and the number of tones that the printer 105 can process. For example, the halftone processor 203 binarizes respective signal values using a 16×16 dither matrix. Alternatively, an error diffusion method may be used. The C'M'Y'K'Lc'Lm' data obtained in this way are input to the printer 105 to print an image.

Details of the color separation profile generation AP 205 will be described later. A printer characteristic input unit 207 inputs, for example, colorimetric data of a color chart required to generate a color separation profile to a color separation profile generator 206. The color separation profile generator 206 stores a generated color separation profile in the color separation profile holding unit 204.

[Color Separation Profile Generator]

Figure 5:
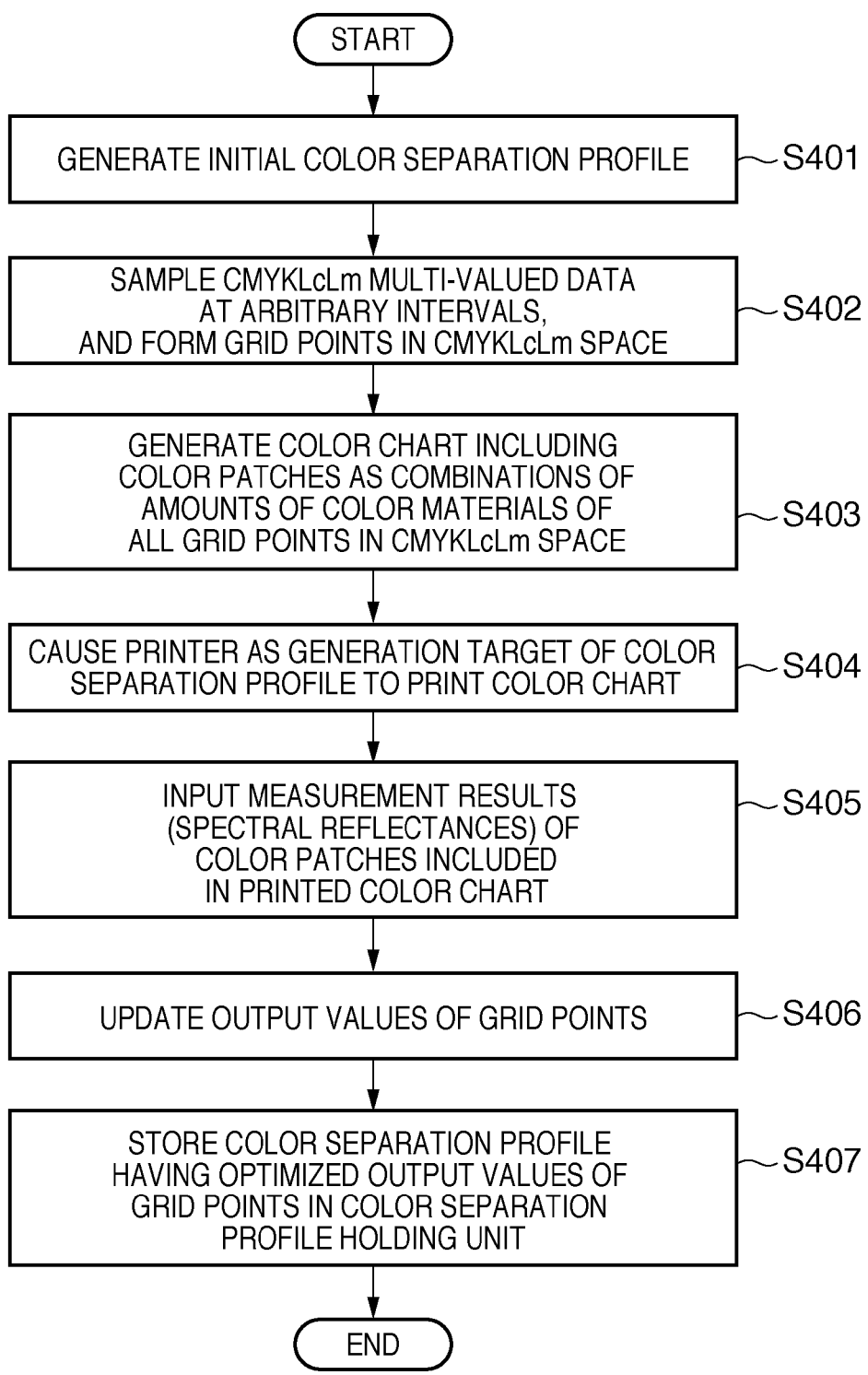
FIG. 5 is a flowchart for explaining color separation profile generation processing.

The color separation profile generation processing will be described below with reference to the flowchart shown in FIG. 5.

The color separation profile generator 206 generates an initial color separation profile (S401). As will be described in detail later, the user inputs and adjusts pieces of color information (signal values indicating amounts of color materials) of representative grid points by operating the UI displayed on the monitor 106, thus generating the initial color separation profile. Alternatively, the user may set a color separation profile having conditions (printer model, print sheets, and print mode) similar to a color separation profile to be generated as the initial color separation profile.

The initial color separation profile set by the aforementioned method has grid points which are uniformly allocated in the RGB space. However, colors corresponding to these grid points are not uniformly allocated in a uniform color space (for example, a CIELab space). Therefore, when a color separation profile generated by interpolations based on the pieces of color information of the representative grid points, which are input and adjusted by the user, is used, adverse effects such as a conversion precision drop of the color separation processor 202 and generation of pseudo contours may occur, as described above.

The color separation profile generator 206 estimates colors in the uniform color space from the output values of the grid points of the color separation profile generated by interpolations from the pieces of color information of the representative grid points, which are input and adjusted by the user. Then, the color separation profile generator 206 updates the output values of the grid points so that the estimated colors corresponding to the grid points are appropriately allocated in the uniform color space (for example, they are allocated uniformly as much as possible). This output value updating processing is executed using color estimation of a cellular Yule-Nielsen spectral Neugebauer model as follows.

The color separation profile generator 206 samples a range of CMYKLcLm multi-valued data at arbitrary intervals to form grid points in a CMYKLcLm space (cell division) (S402). Then, the color separation profile generator 206 generates a color chart including color patches as combinations of amounts of color materials of all the grid points in the CMYKLcLm space (S403). The color separation profile generator 206 outputs the color chart to the halftone processor 203 while setting the color separation processor 202 in a through-pass state, and controls a printer as a generation target of a color separation profile (the printer 105 in this example) to print the color chart (S404). The printer characteristic input unit 207 controls the colorimeter 108 via the driver 107 to input colorimetry results (spectral reflectances) of the color patches included in the printed color chart (S405).

The color separation profile generator 206 calculates, by linear interpolation, spectral reflectances for output values of the grid points of the color separation profile, which do not correspond to the grid points in the CMYKLcLm space, from the spectral reflectances of the grid points which surround each of these output values (combinations of amounts of color materials) (spectral Neugebauer model). In this case, the estimation precision can be improved in consideration of nonlinearity due to dot gains using the Yule-Nielsen model. Then, the color separation profile generator 206 calculates colors (for example, Lab values) corresponding to the output values of the grid points of the color separation profile from the measured spectral reflectances and those which are calculated by linear interpolation, and updates the output values of the grid points (S406). Note that details of the processing for updating the output values of the grid points will be described later.

Note that the color estimation method is not limited to the cellular Yule-Nielsen spectral Neugebauer model. For example, tristimulus values XYZ may be measured in place of spectral reflectances, and XYZ values corresponding to arbitrary combinations of amounts of color materials may be estimated by applying the Neugebauer model.

The color separation profile generator 206 stores the color separation profile optimized by updating the output values of the grid points in step S406 in the color separation profile holding unit 204 (S407), thus ending the processing.

Generation of Initial Color Separation Profile (S401)

Figure 6:
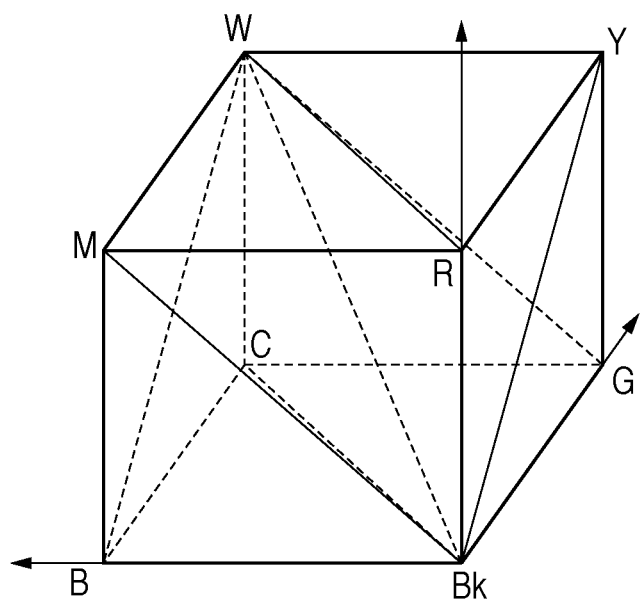
FIG. 6 is a view for explaining an RGB space as a color space of input image signals.

The RGB space as a color space of input image signals will be described below with reference to FIG. 6. Upon generation of the initial color separation profile, amounts of color materials of eight grid points C, M, Y, R, G, B, W, and Bk as vertices of the RGB space shown in FIG. 6 are initially set. Note that coordinates (R, G, B) of the grid points of these vertices are as follows.

C=(0, 255, 255): cyan primary color,
M=(255, 0, 255): magenta primary color,
Y=(255, 255, 0): yellow primary color,
R=(255, 0, 0): red primary color,
G=(0, 255, 0): green primary color,
B=(0, 0, 255): blue primary color,
W=(255, 255, 255): white (corresponding to color (white point) of a print sheet), and
(0, 0, 0): black (corresponding to a darkest point of a printer).

Since W corresponds to paper white, all amounts of color materials are set to be "0".

As for Bk and process colors (primary colors) C, M, and Y, in order to prevent muddiness due to color mixture, amounts of only corresponding color materials are set to be significant, and amounts of other color materials are set to be "0". The amounts of significant color materials are set to satisfy a maximum amount (a maximum amount of applied color materials) applicable to (printable on) a print sheet according to the print sheet used in print processing and a print mode.

R, G, and B are secondary colors reproduced by color mixture. For example, as for R, using color materials corresponding to M and Y, a plurality of color patches corresponding to a plurality of combinations, in each of which a total of amounts of two color materials (a total amount of applied color materials) becomes equal to a maximum amount of applied color materials, are printed by the printer 105. Then, the user visually selects a color patch having a preferred color as R, and sets a combination of the amounts of M and Y color materials of that color patch as an amount of R color material (all amounts of color materials other than M and Y are set to be "0"). Alternatively, color patches may be measured using the colorimeter 108, and a combination of amounts of color materials of a color patch having an intermediate hue value between hues of M and Y color patches may be set as an amount of R color material. Likewise, a combination of amounts of Y and C color materials is set for G, and that of amounts of C and M color materials is set for B.

The aforementioned method of setting the amounts of color materials of the eight vertices is an example, and any other methods may be used as long as the amounts of color materials of the eight vertices can be appropriately set.

Next, amounts of color materials of grid points which are located on the following diagonal lines (to be referred to as diagonal grid points hereinafter) that couple the vertices of the RGB color space shown in FIG. 6 are set.

W-C, W-M, W-Y, W-R, W-G, W-B,
C-Bk, M-Bk, Y-Bk, R-Bk, G-Bk, B-Bk,
R-Y, Y-G, G-C, C-B, B-M, M-R, and
W-Bk.

Figure 7A:
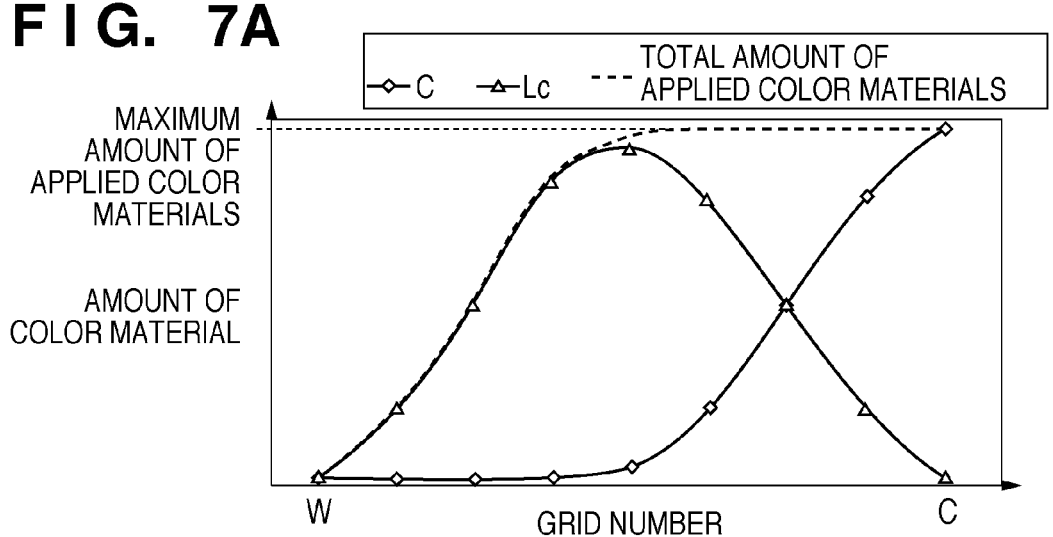
FIGS. 7A to 7C are graphs for explaining color separation of diagonal grid points.

Color separation of the diagonal grid points will be described below with reference to FIGS. 7A to 7C. FIG. 7A shows a color separation example of grid points of a primary color on a diagonal line having a vertex W as a start point. In FIG. 7A, the abscissa plots grid numbers of respective grid points between the diagonal grid points, and the ordinate plots the amounts of color materials and a total amount of applied color materials of the respective grid points. As shown in FIG. 7A, the amounts of all color materials are set to be "0" at the vertex W, light cyan Lc (or Lm) is used to eliminate graininess in a low-density range, and the amount of Lc (or Lm) color material is increased as the density increases. Then, a use rate of light cyan Lc (or Lm) is reduced from a position near an intermediate density from W to C (or W to M), and use of vivid dark cyan C (or M) is started. Then, at a vertex C (or M), the amount of C (or M) color material is set to be a maximum amount of applied color materials, and amounts of other color materials are set to be "0". Note that in color separation on the diagonal line W-Y without using any light color material, the amount of color material of yellow Y is monotonically increased from the low-density range.

Figure 7B:
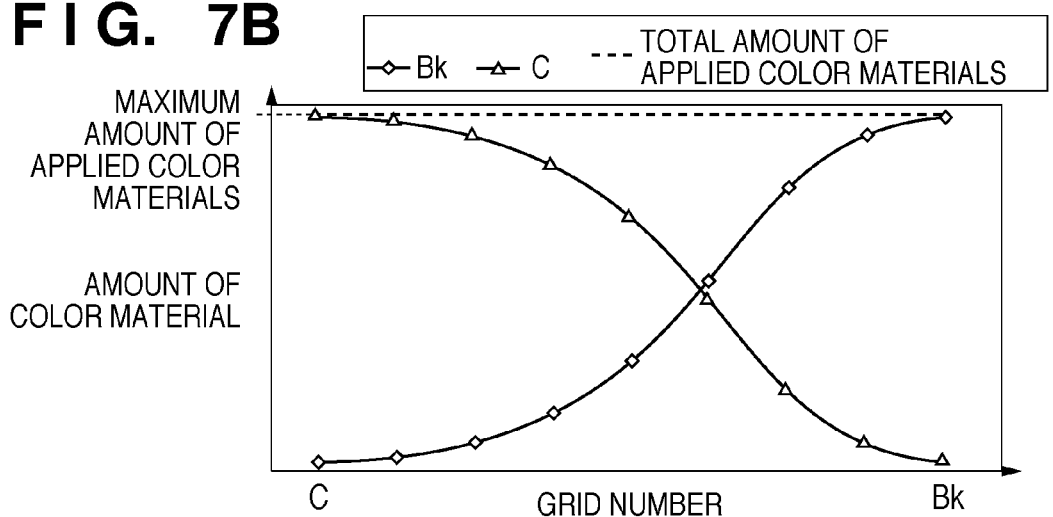

FIG. 7B shows a color separation example of grid points of a primary color on a diagonal line having a vertex Bk as a start point. In FIG. 7B, the abscissa plots grid numbers of respective grid points between the diagonal grid points, and the ordinate plots the amounts of color materials and a total amount of applied color materials of the respective grid points.

As shown in FIG. 7B, at a vertex C (or M or Y), the amount of C (or M or Y) color material is set to be a maximum amount of applied color materials, and amounts of other color materials are set to be "0". A use rate of C (or M or Y) is reduced, and that of black Bk is increased as the density is increased from C to Bk (or from M or Y to Bk). At the vertex Bk, the amount of Bk color material is set to be a maximum amount of applied color materials, and amounts of other color materials are set to be "0".

Figure 7C:
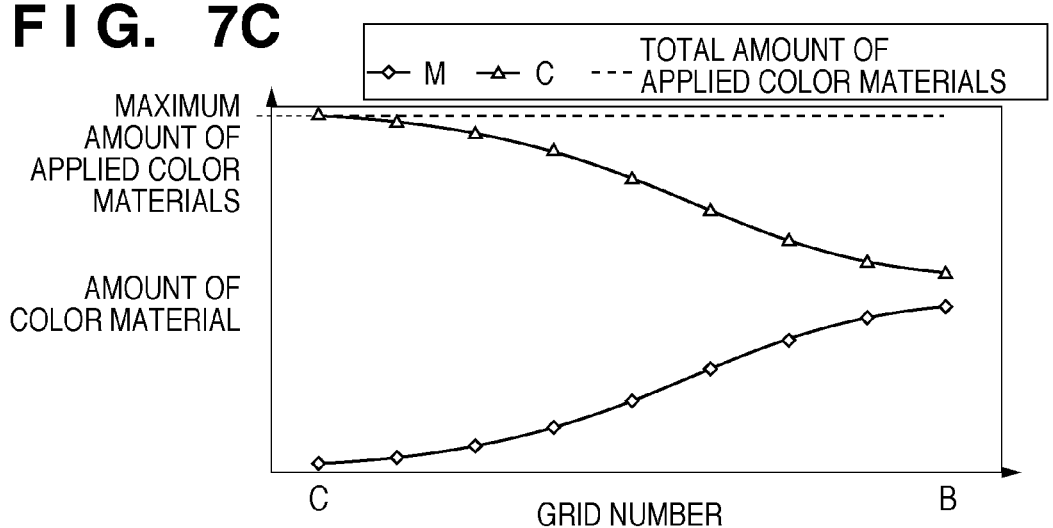

FIG. 7C shows a color separation example of grid points of a secondary color on a diagonal line that does not include the vertex W or Bk. In FIG. 7C, the abscissa plots grid numbers of respective grid points between the diagonal grid points, and the ordinate plots the amounts of color materials and a total amount of applied color materials of the respective grid points. As shown in FIG. 7C, at a vertex C, the amount of C color material is set to be a maximum amount of applied color materials, and amounts of other color materials are set to be "0". A use rate of C is reduced, and that of dark magenta M is increased as the grid position moves from C to B. At a vertex B, amounts of C and M color materials calculated from a color patch are set, and amounts of other color materials are set to be "0". Note that the same applies to color separation of grid points of other secondary colors on diagonal lines that do not include the vertex W or Bk.

FIGS. 7A to 7C do not show any color separation example of grid points on a diagonal line that couples the vertex W or Bk and the vertex of a secondary color. However, from the vertex of the secondary color toward the vertex W, the total amount of two applied color materials can be reduced while maintaining the use rates of the two color materials at the vertex of the secondary color shown in FIG. 7C. Also, from the vertex of the secondary color toward the vertex Bk, the total amount of two applied color materials can be reduced, and the amount of Bk color material can be increased while maintaining the use rates of the two color materials at the vertex of the secondary color shown in FIG. 7C, so as not to exceed a maximum amount of applied color amounts.

The color separation profile generator 206 displays the graphs shown in FIGS. 7A to 7C on the monitor 106, and prompts the user to manually adjust the amounts of respective color materials for respective grid points, thereby deciding the color separation characteristics. Furthermore, the color separation profile generator 206 may print color patches according to the adjustment result using the printer 105, and the user may visually confirm the graininess and colors of the printed color patches to further finely adjust the color separation characteristics.

In this manner, after the amounts of color materials of the vertex grid points and diagonal grid points are set, the color separation profile generator 206 decides amounts of color materials of grid points other than these grid points using, for example, a method disclosed in Japanese Patent Laid-Open No. 2002-033930. This method divides the RGB space into six tetrahedrons WRYBk, WYGBk, WGCBk, WGBBk, WBMBk, and WMRBk including W and Bk, and calculates the amounts of color materials of grid points in the respective tetrahedrons by interpolation processing. That is, the amounts of color materials of grid points of respective sides of four triangles included in each tetrahedron are decided. Hence, contour lines of amounts of color materials for respective color materials are drawn from the amounts of color materials of grid points of the respective sides, and the amounts of color materials of grid points whose amounts of color materials are not decided are interpolated based on the contour lines.

The aforementioned method of setting the color separation characteristics is an example, and any other methods may be used as long as an appropriate color separation result can be obtained.

Updating of Output Values of Grid Points (S406)

Figure 8:
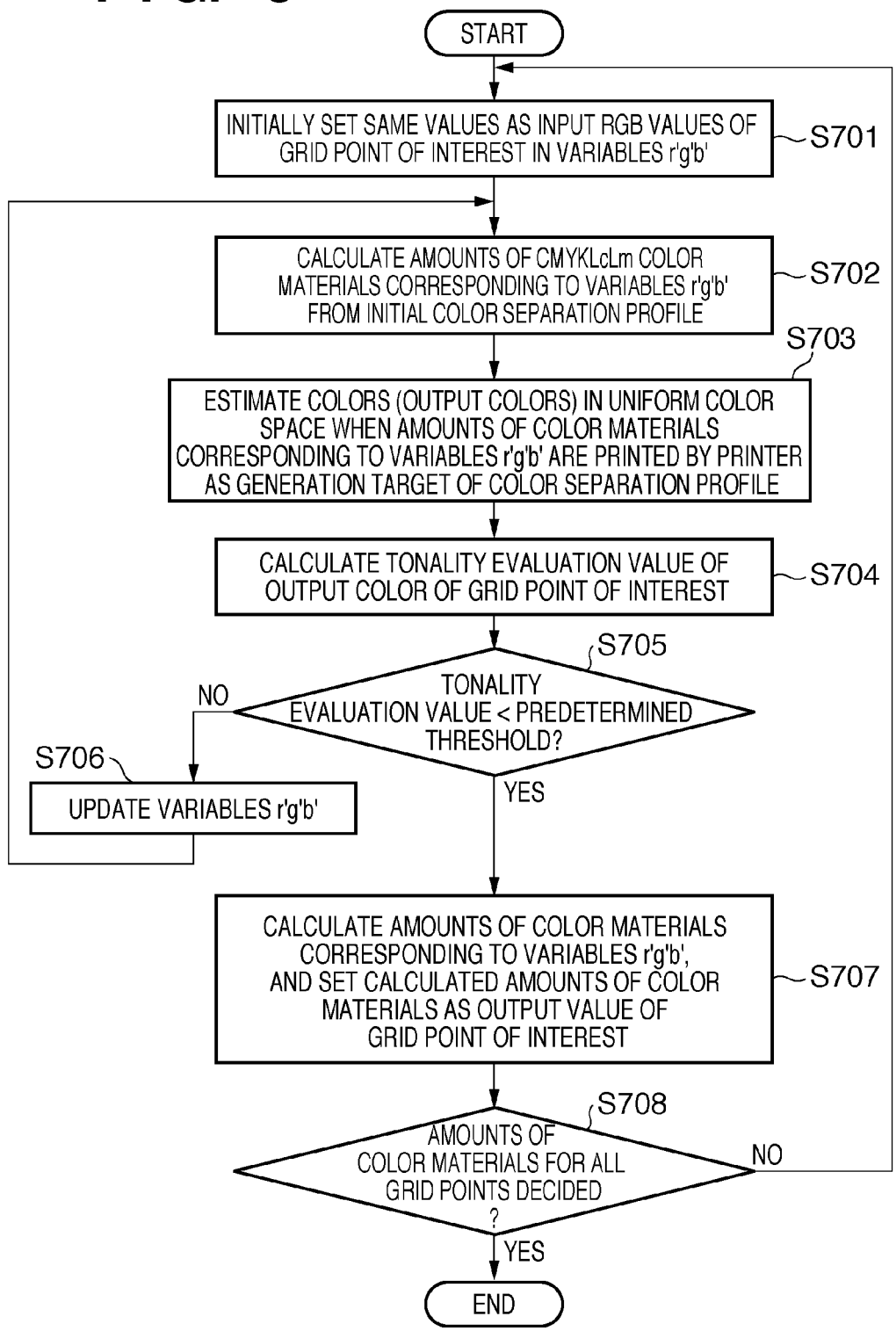
FIG. 8 is a flowchart for explaining details of processing for updating output values of grid points of a color separation profile.

Details of the processing for updating the output values of the grid points of the color separation profile (S406) will be described below with reference to the flowchart shown in FIG. 8.

The color separation profile generator 206 initially sets the same values as input values RGB of a grid point of interest in variables r'g'b' (S701). Then, the color separation profile generator 206 calculates amounts of CMYKLcLm color materials corresponding to the variables r'g'b' from the initial color separation profile using, for example, tetrahedral interpolation (S702). The color separation profile generator 206 estimates colors (output colors) in the uniform color space when the amounts of color materials corresponding to the variables r'g'b' are printed using a printer as a generation target of a color separation profile (the printer 105 in this example) (S703). This estimation is implemented by interpolating (estimating) a spectral reflectance of a color patch printed using the amounts of color materials corresponding to the variables r'g'b' using the colorimetry results acquired in step S402 and the cellular Yule-Nielsen spectral Neugebauer model. Then, the color separation profile generator 206 calculates tristimulus values XYZ from the estimated spectral reflectance, spectral characteristics of a predetermined light source (for example, D50), and a color matching function of a CIEXYZ color system, and converts the XYZ values into, for example, Lab values. Note that the uniform color space is not limited to the CIELab space. For example, a Jab space of CIECAM97s may be used. Alternatively, lightness information L* and chromaticity information (metric chromaticity $c^*=\sqrt{(a^{*2}+b^{*2})}$) may be used.

Next, the color separation profile generator 206 calculates a tonality evaluation value of the output color of the grid point of interest (S704). As will be described in detail later, the tonality evaluation value becomes smaller as the positional relationship between the output color of the grid point of interest and those of a plurality of grid points adjacent to the grid point of interest (adjacent grid points) in the CIELab space is more uniform.

The color separation profile generator 206 then determines whether or not the tonality evaluation value of the grid point of interest is less than a predetermined threshold (S705). If the tonality evaluation value of the grid point of interest is less than the predetermined threshold, it indicates that the output color of the grid point of interest is optimized in the CIELab space, and the process advances to step S707. If the tonality evaluation value of the grid point of interest is equal to or larger than the predetermined threshold, the color separation profile generator 206 updates the variables r'g'b' according to a predetermined algorithm (for example, a quasi-Newton method or damped least square method) (S706), and the process returns to step S702. Note that if it is determined in step S705 that the processes in steps S702 to S704 have been executed a predetermined number of times, it is presumed that the output color of the grid point of interest is optimized in the CIELab space, and the process advances to step S707.

After the output color of the grid point of interest is optimized in the CIELab space, the color separation profile generator 206 calculates amounts of color materials corresponding to the variables r'g'b' as in step S702, and sets the calculated amounts of color materials as the output values of the grid point of interest (S707).

Next, the color separation profile generator 206 repeats the processes in steps S701 to S708 until it is determined in step S708 that amounts of color materials are decided for all grid points. Note that by further repeating the aforementioned processes a predetermined number of times for all the grid points, the output colors of the grid points can be allocated more uniformly within the gamut of the printer 105.

In this way, by updating the output values of the respective grid points via the variables r'g'b', the output colors (output values) of the grid points of the color separation profile can be optimized based on the color separation characteristics set by the user. For example, the user adjusts the use method of dark and light color materials in consideration of graininess in the low-density range, but the use method of color materials is never changed in the processing for updating the output values (S404). Therefore, only allocations of the output colors corresponding to the grid points are optimized without impairing image quality factors such as graininess.

Note that the amounts of CMYKLcLm color materials may be directly optimized. In this case, arbitrary restraint conditions are given to maintain the use method of color materials, or processing for calculating an image quality evaluation value of, e.g., graininess, and setting a weighted sum of the image quality and tonality evaluation values as a target function is executed.

Tonality Evaluation Value (S704)

Figure 9A:
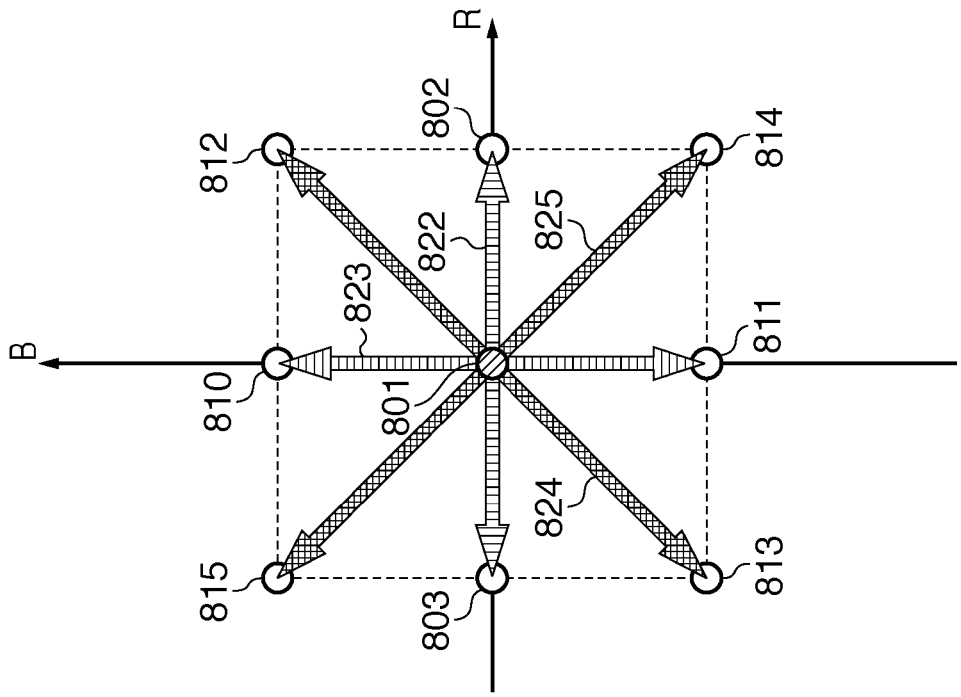
FIGS. 9A and 9B are views for explaining a grid point of interest, adjacent grid points, and evaluation directions.

A grid point of interest, adjacent grid points, and evaluation directions will be described below with reference to FIGS. 9A and 9B. FIG. 9A is an enlarged view around a grid point 801 of interest, and shows adjacent grid points by adding respective RGB values by ±32 to have the grid point 801 of interest as the center. In the tonality evaluation value calculation processing (S704), the positional relationships between the output color of the grid point 801 and those of 20 adjacent grid points 802 to 821 shown in FIG. 9A in the CIELab space are evaluated.

Figure 9B:
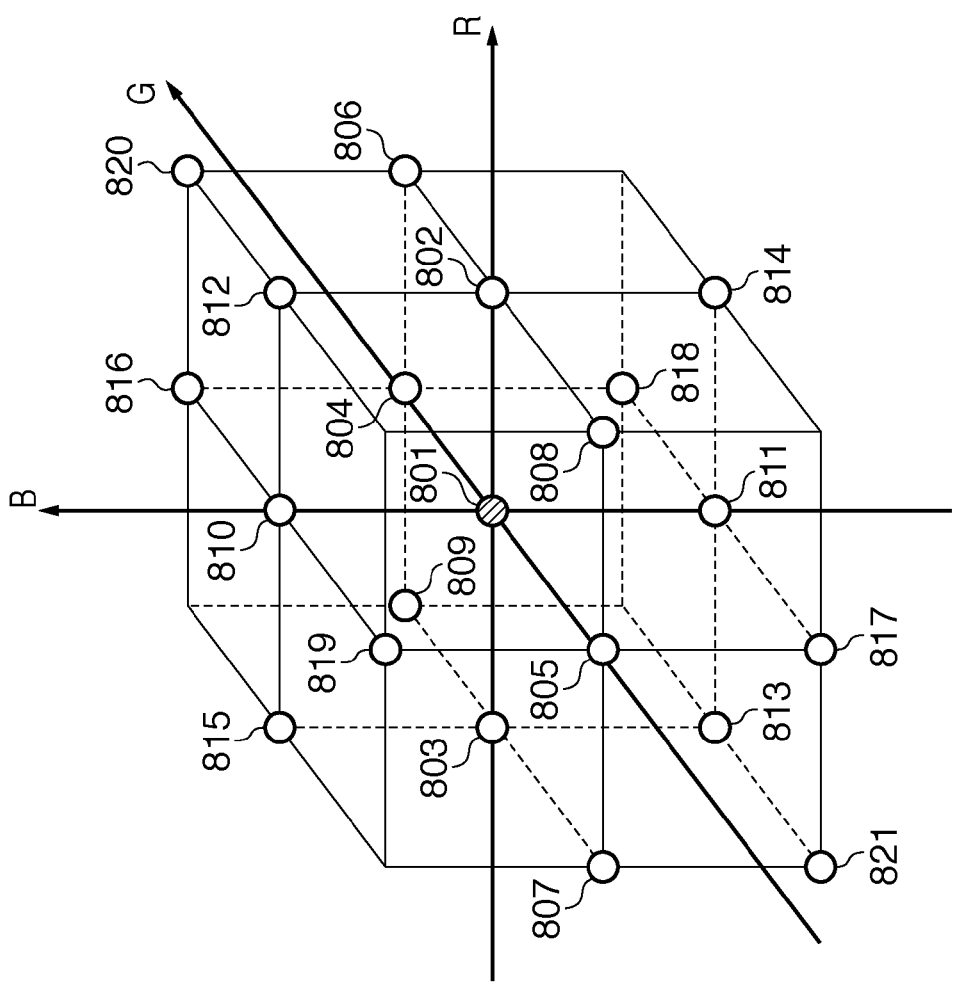

FIG. 9B shows tonality evaluation directions, and shows an RB plane having the grid point 801 of interest as the center for the sake of simplicity. A line segment 822 couples the grid point 801 of interest, an adjacent grid point 802 in a +R direction, and an adjacent grid point 803 in a –R direction. A line segment 823 couples the grid point 801 of interest, an adjacent grid point 810 in a +B direction, and an adjacent grid point 811 in a –B direction. A line segment 824 couples the grid point 801 of interest, an adjacent grid point 812 in a +R+B direction, and an adjacent grid point 813 in a –R–B direction. A line segment 825 couples the grid point 801 of interest, an adjacent grid point 814 in a +R–B direction, and an adjacent grid point 815 in a –R+B direction. A tonality evaluation value Ed is calculated for each of these line segments, and a weighted sum of the evaluation values Ed of all the line segments is finally calculated as an evaluation value GRAi of the grid point 801 of interest. Note that the evaluation values Ed are calculated for the following 10 line segments.

+R direction: a line segment that passes through the grid points 802, 801, and 803, +G direction: a line segment that passes through the grid points 804, 801, and 805, +B direction: a line segment that passes through the grid points 810, 801, and 811, +R+G direction: a line segment that passes through the grid points 806, 801, and 807, +R–G direction: a line segment that passes through the grid points 808, 801, and 809, +R+B direction: a line segment that passes through the grid points 812, 801, and 813, +R–B direction: a line segment that passes through the grid points 814, 801, and 815, +G+B direction: a line segment that passes through the grid points 816, 801, and 817, +G–B direction: a line segment that passes through the grid points 818, 801, and 819, and +R+G+B direction (lightness direction): a line segment that passes through the grid points 820, 801, and 821.

Figure 10:
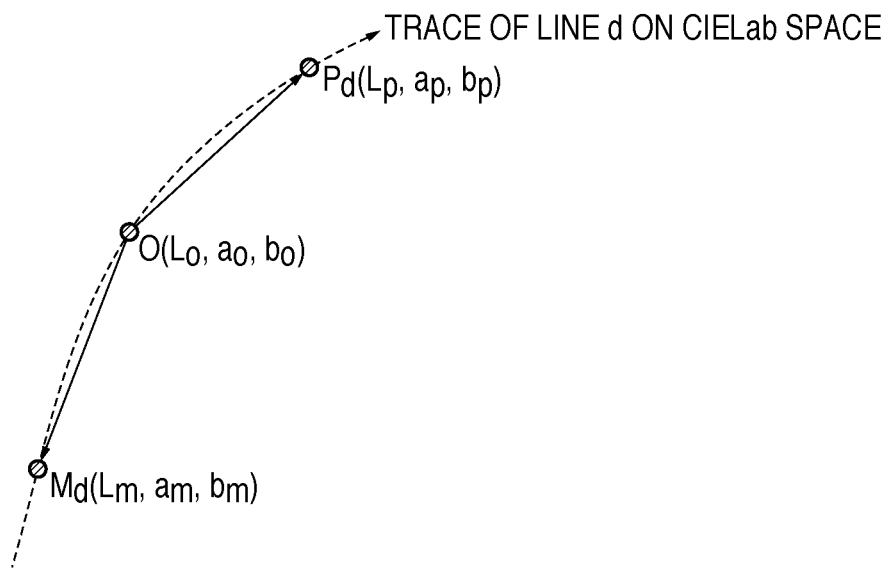
FIG. 10 is a view for explaining calculations of a tonality evaluation value GRAi.

The calculations of the tonality evaluation value GRAi will be described below with reference to FIG. 10. FIG. 10 illustrates a state in which a line d corresponding to one of the aforementioned line segments is plotted in the CIELab space. A point O is a plot of the grid point 801 of interest, and has values $(L^*, a^*, b^*) = (L_o, a_o, b_o)$ corresponding to the estimated output color of the grid point of interest. Likewise, points Pd and Md are plots of adjacent grid points, and respectively have values $(L^*, a^*, b^*) = (L_p, a_p, b_p)$ and $(L^*, a^*, b^*) = (L_m, a_m, b_m)$. The tonality evaluation value Ed of the line d is calculated by:

$$Ed = \alpha i (L_p + L_m - 2L_O)^2 / (L_p - L_m)^2 + \\ \beta i (a_p + a_m - 2a_O)^2 / (a_p - a_m)^2 + \gamma i (b_p + b_m - 2b_O)^2 / (b_p - b_m)^2 \quad (1)$$

where $\alpha i$, $\beta i$, and $\gamma i$ are coefficients decided according to the position of the grid point of interest.

The decision method of the coefficients $\alpha i$, $\beta i$, and $\gamma i$ will be described later. The tonality evaluation values Ed are calculated for the above 10 line segments, and the weighted sum of these evaluation values Ed is calculated as the tonality evaluation value GRAi of the grid point of interest by:

$$GRAi = \Sigma_d wd \cdot Ed \quad (2)$$

where d is an index required to identify the line segment, and wd is a weighting coefficient according to each line segment.

Note that the direction to which the user attaches importance of those of the line segments can be adjusted by adjusting the weight wd in equation (2).

As can be seen from equation (1), each evaluation value Ed becomes smaller as the points O, Pd, and Md are arranged linearly and the lengths of line segments O-Pd and O-Md are equal to each other. That is, when the estimated output color (point O) of the grid point of interest is updated to reduce the evaluation value Ed, the output colors of respective grid points can be uniformly allocated in the CIELab space.

Figure 1:
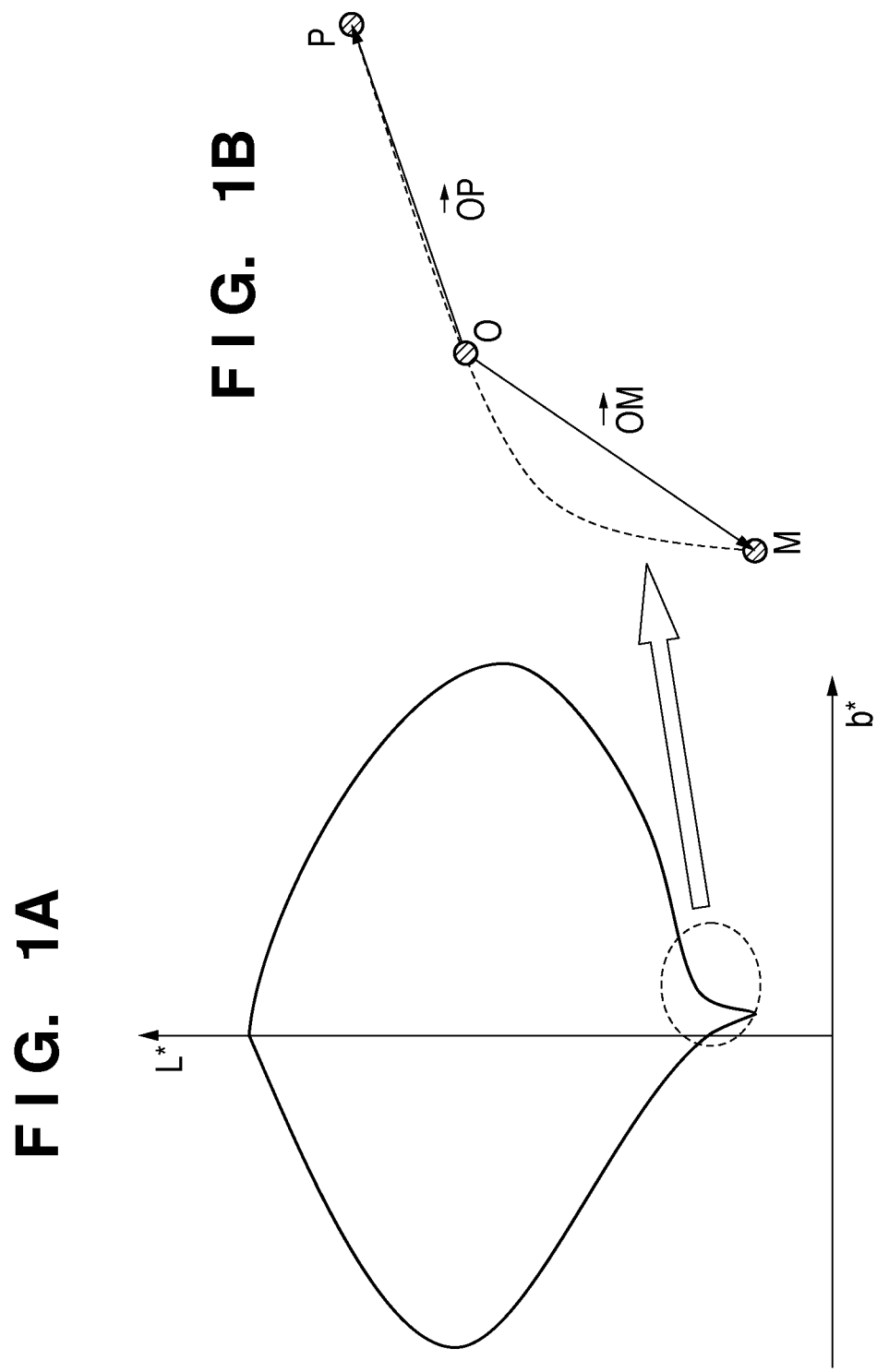
FIGS. 1A and 1B are views for explaining a smoothing effect reduction when a gamut shape is deformed.

However, the shape of the gamut of the printer is deformed depending on the characteristics of color materials. Especially, when pigments are used as color materials, phenomena such as complicated color development at the time of color mixture, and changes of densities depending on the application orders and speeds of color materials onto a print sheet are known. The adverse effect of the complicated color development tends to be conspicuous in a dark part in which color separation is complicated. For example, at the instance of color mixture of specific color materials, the density lowers, and the gamut often has a shape having the narrow darkest part, as shown in FIG. 1A. When the shape of the gamut is deformed in this way, the calculation results of the tonality evaluation values Ed have to be changed depending on the position of the grid point of interest, so as to generate a color separation profile which can prevent any pseudo contour from being generated and any color conversion precision drop in the color separation processor 202. In this embodiment, the calculation results of the evaluation values Ed are changed by changing the weighting coefficients αi, βi, and γi in equation (1) depending on the position of the grid point of interest. For example, the weighting coefficients αi, βi, and γi are decided by:

$$\alpha i = q \times (1.0 - L_{hls})^p + r$$

$$\beta i = r$$

$$\gamma i = r \qquad (3)$$

where $L_{hls}$=max(R', G', B'), that is, lightness information of the grid point of interest, q, p, and r are constants, and R', G', and B' are position information of the grid point of interest, that is, values within a range from 0 to 1 obtained by normalizing the RGB values of the grid point of interest (to divide the RGB values by 255 in case of 8 bits per component).

Figure 11:
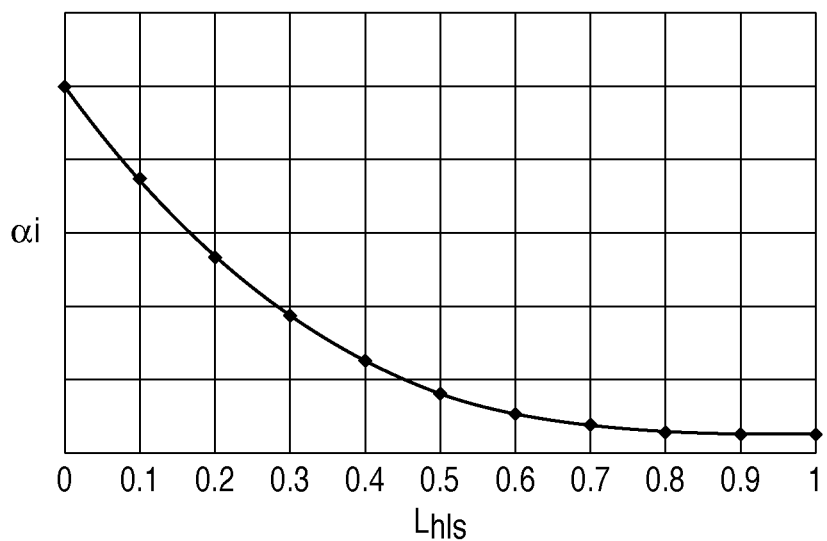
FIG. 11 is a graph showing the relationship between lightness information $L_{hls}$ and a weight αi.

FIG. 11 shows the relationship between the lightness information $L_{hls}$ and weight αi. As shown in FIG. 11, αi increases with decreasing $L_{hls}$. That is, the weighting coefficient αi becomes larger in a dark part of the gamut, and the evaluation value Ed that attaches importance to tonality (gradation) in the lightness L* direction having the weight αi can be obtained.

The optimizing state of output colors of grid points will be described below with reference to FIGS. 12A and 12B. FIG. 12A illustrates the shape of a gamut of a certain printer as in FIG. 1A, and shows an L*b* plane in the CIELab space. The gamut of the certain printer has a shape which is deformed to be drastically narrowed in a dark part with low lightness L*. FIG. 12B shows processing for smoothing output values (color-separated values) of grid points in the dark part shown in FIG. 12A as in FIG. 1B. Reference symbols P, O, and M denote grid points, and a broken curve represents a color trace of the CIELab space, which is reproduced in practice. When output values of the grid points P and M are given, and an output value of the grid point O located between the grid points P and M is optimized by the aforementioned method, the weighting coefficient αi is increased in the dark part of the gamut, and the tonality evaluation value Ed which attaches importance to tonality (gradation) in the lightness L* direction is calculated.

Therefore, by optimizing the output value of the grid point O by the aforementioned method, the output value of the grid point O is decided to minimize a deviation between line segments OP and OM that couple the grid points, and an actual color reproduction trace (broken curve), as shown in FIG. 12B. When the color separation profile is generated in this way, the output values between the grid points O and M and between the grid points O and P can be precisely estimated from those of the surrounding grid points. In the dark part having the deformed gamut shape, generation of any pseudo contour and a color reproduction precision drop can be prevented.

In the example of the above description, when the tonality evaluation value Ed is calculated in the dark part having the deformed gamut shape of the printer, the weighting coefficient αi of the tonality evaluation value in the lightness L* direction is increased to optimize output values of grid points in the dark part of the gamut. However, a region having the deformed shape is not limited to the dark part. For example, when pigments are used as color materials, the gamut shape is often deformed in the hue and saturation directions in a high-saturation range of cyan. In such case, $S_{hls}$=max(R', G', B')−min(R', G', B') is calculated as saturation information. When $S_{hls}$ is large, the weighting coefficients βi and γi of the tonality evaluation value in the chromaticity a* and b* directions may be increased. Note that a metric saturation may be used as saturation information. As for a hue, hues can be similarly calculated from R', B', and G', and the weighting coefficients βi and γi can be increased at a specific hue. Furthermore, lightness information, saturation information, and hue information are calculated from R', B', and G' to specify a region including output colors of grid points based on combinations of these pieces information, and the weighting coefficients αi, βi, and γi can be controlled according to that region.

Second Embodiment

Color processing according to the second embodiment of the present invention will be described below. Note that the same reference numerals in the second embodiment denote the same components as those in the first embodiment, and a detailed description thereof will not be repeated.

When a color material whose color development characteristics are curved in a high-density part (to be nonlinear in a CIELab space), the shape of a gamut of a high-saturation part is deformed in hue and saturation directions. In such case, not only a weighting coefficient αi but also a weighting coefficient βi in a chromaticity a* direction and a weighting coefficient γi in a chromaticity b* direction are appropriately set, thus allowing to generate a more preferable color separation profile. The second embodiment will explain color separation profile generation processing which can cope with arbitrary gamut shapes.

Processing for updating output values of grid points of a color separation profile (S406) according to the second embodiment will be described below with reference to the flowchart shown in FIG. 13. Note that the same step numbers denote the same processes as those shown in FIG. 8 of the first embodiment, and a detailed description thereof will not be repeated.

A color separation profile generator 206 initializes the weighting coefficients to αi=βi=γi=r (constant) (S700), and executes processes in steps S701 to S705. As in the first embodiment, if a tonality evaluation value GRAi of a grid point of interest is equal to or larger than a predetermined threshold (first threshold), the color separation profile generator 206 updates variables r'g'b' (S706), and the process returns to step S702. If the tonality evaluation value GRAi of the grid point of interest is less than the first threshold, or if it is determined in step S705 that the processes in steps S702 to S704 have been executed a predetermined number of times, the process advances to step S711.

The color separation profile generator 206 determines whether or not the tonality evaluation value GRAi of the grid point of interest is less than a second threshold (<the first threshold) (S711). If the tonality evaluation value GRAi of the grid point of interest is less than the second threshold, the process branches to S707 to end optimization of the output color of the grid point of interest. On the other hand, if the tonality evaluation value GRAi of the grid point of interest is equal to or larger than the second threshold, the weighting coefficients αi, βi, and γi are changed (S712) by:

$$\alpha i = r/T \cdot (L_p\max + L_m\max - 2L_O)^2 / (L_p\max - L_m\max)^2 \quad (4)$$

$$\beta i = r/T \cdot (a_p\max + a_m\max - 2a_O)^2 / (a_p\max - a_m\max)^2$$

$$\gamma i = r/T \cdot (b_p\max + b_m\max - 2b_O)^2 / (b_p\max - b_m\max)^2$$

$$T = (L_p\max + L_m\max - 2L_O)^2 / (L_p\max - L_m\max)^2 +$$

$$(a_p\max + a_m\max - 2a_O)^2 / (a_p\max - a_m\max)^2 +$$

$$(b_p\max + b_m\max - 2b_O)^2 / (b_p\max - b_m\max)^2$$

where ($L_p$max, $a_p$max, $b_p$max) and ($L_m$max, $a_m$max, $b_m$max) are L*a*b* values of grid points on a line segment corresponding to a maximum evaluation value Ed of 10 directions used to evaluate tonality (gradation).

Then, the process returns to step S701.

When the gamut shape is approximate to a square, if optimization is done using αi=βi=γi, the evaluation values GRAi assume sufficiently small values at all grid points. However, since the gamut shape is deformed, if optimization is done using αi=βi=γi, the evaluation values GRAi assume relatively large values. Then, after optimization using αi=βi=γi, the magnitude of the value GRAi is checked in step S711 to determine the influence of a deformation due to the gamut shape. A grid point which is determined to have a large influence of a deformation (GRAi≥second threshold) undergoes optimization again using equations (4) after the weighting coefficient in an axis direction in which a deformation may be large is increased. By optimizing the output colors of grid points in this way, a preferable color separation profile can be generated not only for the gamut in which the darkest part has a deformed shape but also to gamuts having arbitrary shapes.

An optimization result example according to the second embodiment will be explained below with reference to FIGS. 14A and 14B. FIG. 14A illustrates the shape of a gamut of a certain printer, and shows an a*b* plane in the CIELab space. Reference symbol W denotes a chromaticity point of white corresponding to a grid point (255, 255, 255). Likewise, reference symbols R, Y, G, C, B, and M respectively denote chromaticity points corresponding to grid points of primary colors. Broken curves represent chromaticity traces, in the CIELab space, of diagonal lines W-R, W-Y, W-G, W-C, W-B, and W-M on an RGB space. Solid curves represent chromaticity traces, in the CIELab space, of diagonal lines R-Y, Y-G, G-C, C-B, and B-M in the RGB space. As shown in FIG. 14A, when the diagonal lines that couple vertices of the RGB space are plotted in the CIELab space, they do not become straight lines but become curves which indicate deformations of a high-saturation range.

Figure 14B:
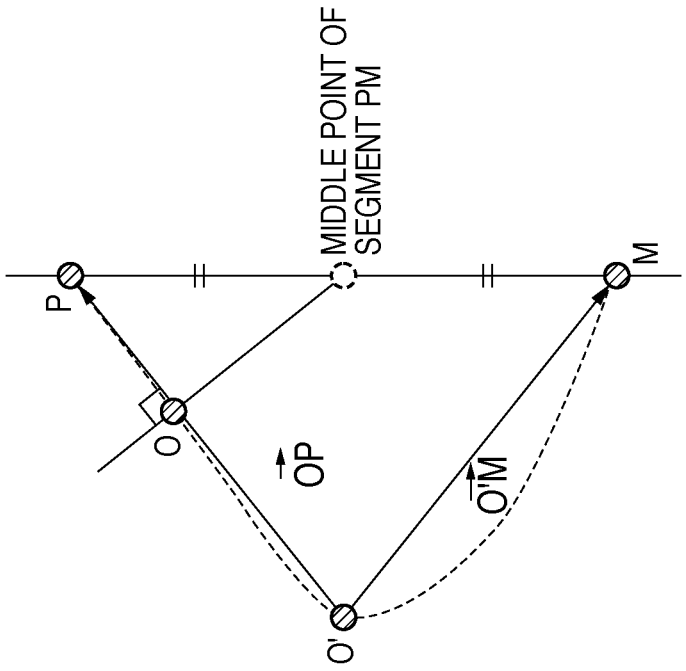
FIGS. 14A and 14B are views for explaining an optimization result according to the second embodiment.
Figure 14A:
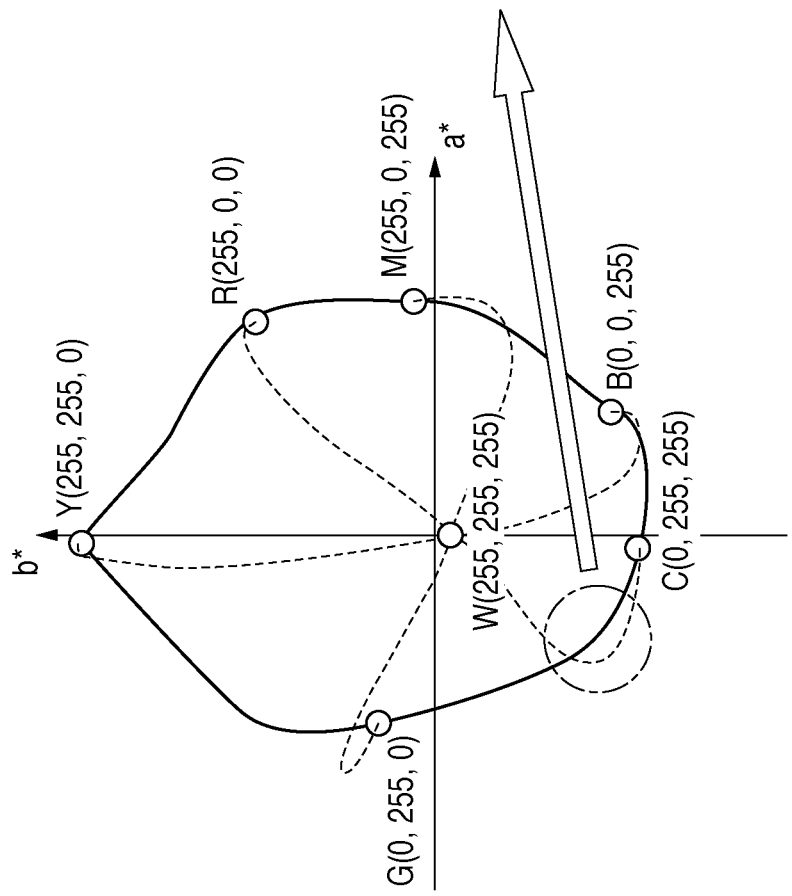

A broken curve in FIG. 14B represents a color trace around a cyan region in FIG. 14A, and reference symbols P, O, and M denote output colors of grid points. When the output color of the grid point O is calculated from those of the grid points P and M, an optimization result based on αi=βi=γi minimizes a Euclidean distance between O and a middle point of a line segment that couples P and M. That is, an intersection when a normal depending from the middle point between P and M to the color trace (broken curve) is O. In this case, a deviation between $\overrightarrow{OM}$ and the color trace (broken curve) is large, as shown in FIG. 14B.

In the second embodiment, in step S712, the weighting coefficients are adjusted to increase the weighting coefficient γi in the chromaticity b* direction to execute optimization again. As a result, the output color of the grid point O is updated by O', and $\overrightarrow{O'M}$ for which a deviation of the color trace (broken curve) is reduced can be obtained, as shown in FIG. 14B.

Modification of Embodiments

The above embodiments have exemplified a six-color printer of CMYKLcLm, but the number of color materials is not limited. Printers using a larger number of color materials have complicated gamut shapes, and image deterioration such as a pseudo contour generally tends to occur. That is, the present invention is effective for generation of a color separation profile for a printer using a large number of color materials.

The above embodiments have exemplified the case in which the present invention is implemented as the AP 101 running on the computer 100. However, the present invention is not limited to this. For example, the present invention can also be implemented as a profile generation apparatus built in a printer.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-275936, filed Dec. 3, 2009, which is hereby incorporated by reference herein in its entirety.

What is claimed is:

1. A color processing apparatus for generating a profile for color separation that indicates a relationship between input color values in an input color space and output signal values to be output to an image forming device, the apparatus comprising:

an estimator, configured to estimate a color value in a color space, which is represented by lightness and chromaticity, of an output color reproduced by an output signal value, wherein the output signal value is obtained by sampling a range of the output signal value and corresponds to an input color value of a grid point of the input color space;

a calculator, configured to calculate an evaluation value of tonality between a color value estimated to an input color value of a grid point of interest of the input color space by the estimator and color values estimated to input color values of grid points adjacent to the grid point of interest by the estimator;

a determiner, configured to determine whether or not the evaluation value becomes less than a predetermined threshold value by changing the input color value of the grid point of interest;

a setting section, configured to set the output signal value, which reproduces an output color corresponding to the estimated color value of the grid point of interest, to the grid point of interest when the input color value of the grid point of interest, whose the evaluation value becomes less than the predetermined threshold value, is obtained, wherein the calculator calculates the evaluation value by enlarging weight in a direction of the lightness more than weight in a direction of the chromaticity.

2. A color processing apparatus for generating a profile for color separation that indicates a relationship between input values of input values of input image signals and output values of image signals to be output to an image forming device, the apparatus comprising:

a generator, configured to generate an initial profile for color separation which sets output values of other grid points in a color space from output values corresponding to representative grid points in the color space of the input image signals;

an estimator, configured to estimate output colors to be formed by the image forming device in correspondence with input values of grid points in the color space using the initial profile for color separation, and colorimetry results of color patches formed by the image forming device based on signal values obtained by sampling a range of the output values;

a calculator, configured to calculate an evaluation value that evaluates tonality between the output color estimated in correspondence with an input value of a grid point of interest in the color space and output colors estimated in correspondence with input values of grid points adjacent to the grid point of interest;

a repetition section, configured to change an input value of the grid point of interest until the evaluation value becomes less than a predetermined threshold, and to control estimator and calculator to repeat the prediction of the output color based on the changed input value and the calculation of the evaluation value; and an updater, configured to update, when the input value of the grid point of interest, whose evaluation value becomes less than the predetermined threshold, is obtained, the output value of the grid point of interest by an output value corresponding to the input value calculated using the initial profile for color separation wherein the calculator calculates the evaluation value by a calculation formula having weighting coefficients corresponding to respective axis directions of the color space which expresses the output colors.

3. The apparatus according to claim 2, wherein the calculator controls the weighting coefficients according to a gamut shape of the image forming device.

4. The apparatus according to claim 2, wherein the calculator calculates differences between the estimated output color and the output colors of the adjacent grid points in the respective axis directions, and controls the weighting coefficients corresponding to the respective axis directions according to the differences.

5. The apparatus according to claim 2, further comprising a storing section configured to store a relationship between input values and output values of respective grid points as the profile for color separation in a memory after the updater updates the output values of all grid points in the color space of the image signals.

6. A method of generating a profile for color separation that indicates a relationship between input color values in an input color space and output signal values to be output to an image forming device, the method comprising:

using a processor to perform the steps of:

estimating a color value in a color space, which is represented by lightness and chromaticity, of an output color reproduced by an output signal value, wherein the output signal value is obtained by sampling a range of the output signal value and corresponds to an input color value of a grid point of the input color space;

calculating an evaluation value of tonality between a color value estimated to an input color value of a grid point of interest of the input color space in the estimating step and color values estimated to input color values of grid points adjacent to the grid point of interest in the estimating step;

determining whether or not the evaluation value becomes less than a predetermined threshold value by changing the input color value of the grid point of interest;

setting the output signal value, which reproduces an output color corresponding to the estimated color value of the grid point of interest, to the grid point of interest when the input color value of the grid point of interest, that the evaluation value becomes less than the predetermined threshold value, is obtained, wherein in the calculating step, the evaluation value is calculated by enlarging weight in a direction of the lightness more than weight in a direction of the chromaticity.

7. A method of generating a profile for color separation that indicates a relationship between input values of input image signals and output values of image signals to be output to an image forming device, the method comprising:

using a processor to perform the steps of:

generating an initial profile for color separation which sets output values of other grid points in a color space from output values corresponding to representative grid points in the color space of the input image signals;

estimating output colors to be formed by the image forming device in correspondence with input values of grid points in the color space using the initial profile for color separation, and colorimetry results of color patches formed by the image forming device based on signal values obtained by sampling a range of the output values;

calculating an evaluation value that evaluates tonality between the output color estimated in correspondence with an input value of a grid point of interest in the color space and output colors estimated in correspondence with input values of grid points adjacent to the grid point of interest;

changing an input value of the grid point of interest until the evaluation value becomes less than a predetermined threshold, and controlling the estimating step and the calculating step to repeat the prediction of the output color based on the changed input value and the calculation of the evaluation value; and updating, when the input value of the grid point of interest, whose evaluation value becomes less than the predetermined threshold, is obtained, the output value of the grid point of interest by an output value corresponding to the input value calculated using the initial profile for color separation, wherein in the calculating step, the evaluation value is calculated by a calculation formula having weighting coefficients corresponding to respective axis directions of the color space which expresses the output colors.

8. A non-transitory computer readable medium storing a computer-executable program for causing a computer to perform a method of generating a profile for color separation that indicates a relationship between input color values in an input color space and output signal values to be output to an image forming device, the method comprising:
  estimating a color value in a color space, which is represented by lightness and chromaticity, of an output color reproduced by an output signal value, wherein the output signal value is obtained by sampling a range of the output signal value and corresponds to an input color value of a grid point of the input color space;
  calculating an evaluation value of tonality between a color value estimated to an input color value of a grid point of interest of the input color space in the estimating step and color values estimated to input color values of grid points adjacent to the grid point of interest in the estimating step;
  determining whether or not the evaluation value becomes less than a predetermined threshold value by changing the input color value of the grid point of interest;
  setting the output signal value, which reproduces an output color corresponding to the estimated color value of the grid point of interest, to the grid point of interest when the input color value of the grid point of interest, whose the evaluation value becomes less than the predetermined threshold value, is obtained,
  wherein in the calculating step, the evaluation value is calculated by enlarging weight in a direction of the lightness more than weight in a direction of the chromaticity.

9. A non-transitory computer readable medium storing a computer-executable program for causing a computer to perform a method of generating a profile for color separation that indicates a relationship between input values of input image signals and output values of image signals to be output to an image forming device, the method comprising:
  generating an initial profile for color separation which sets output values of other grid points in a color space from output values corresponding to representative grid points in the color space of the input image signals;
  estimating output colors to be formed by the image forming device in correspondence with input values of grid points in the color space using the initial profile for color separation, and colorimetry results of color patches formed by the image forming device based on signal values obtained by sampling a range of the output values;
  calculating an evaluation value that evaluates tonality between the output color estimated in correspondence with an input value of a grid point of interest in the color space and output colors estimated in correspondence with input values of grid points adjacent to the grid point of interest;
  changing an input value of the grid point of interest until the evaluation value becomes less than a predetermined threshold, and controlling the estimating step and the calculating step to repeat the prediction of the output color based on the changed input value and the calculation of the evaluation value; and
  updating, when the input value of the grid point of interest, whose evaluation value becomes less than the predetermined threshold, is obtained, the output value of the grid point of interest by an output value corresponding to the input value calculated using the initial profile for color separation,
  wherein in the calculating step, the evaluation value is calculated by a calculation formula having weighting coefficients corresponding to respective axis directions of the color space which expresses the output colors.

* * * * *